United States Patent Office 3,248,382
Patented Apr. 26, 1966

3,248,382
METHOD OF ISOLATING ACETYLATED POLYSACCHARIDES
Robert H. Marchessault, Syracuse, and Patricia D. Cafferty, Rockaway Park, N.Y., assignors, by mesne assignments, to FMC Corporation, San Jose, Calif., a corporation of Delaware
No Drawing. Filed Sept. 7, 1962, Ser. No. 222,770
7 Claims. (Cl. 260—234)

This invention relates to a process for producing water-soluble, film-forming polysaccharides.

The hemicellulose components of wood, straw and other vegetable material contains xylan which has randomly attached acetyl groups as well as methyl glucuronic acid ester groups along the polymer chain. Any procedure for extracting xylan rich hemicellulose which does not saponify the native acetyl groups along the xylan chain will yield a material which can be dissolved in water and cast into clear films which retain water solubility.

A principal object of this invention is to provide an inexpensive method of producing water-soluble, film-forming polysaccharide from natural cellulose containing materials.

Another object of this invention is to provide a method of extracting acetylated xylan from substantially lignin-free, or partially delignified, vegetable material which has not been deactylated by the delignification treatment.

These and other objects are accomplished in accordance with this invention which comprises the steps of treating a delignified, acetylated polysaccharide containing vegetable material with liquid ammonia until the material reaches a swollen condition, and extracting water-soluble, acetylated polysaccharides with buffered wated at a pH of about 4 to 6. A pH of 5 is preferable in order to prevent either hydrolysis or deactylation from taking place. The buffered water extracting medium is preferably heated to 70-75° C. during the extraction period to obtain a higher yield. Extracted acetylated polysaccharide may easily be precipitated from the extraction liquid by adding alcohol and a small amount of concentrated mineral acid. The precipitate is permitted to settle, washed, and air dried to obtain the solid water-soluble product ready for storage and film casting.

The starting material which is employed for this invention is a substantially lignin-free product prepared with a procedure which does not destroy the acetyl groups in the polysaccharide molecule. Preferably, hardwood, which contain a higher percentage of acetylated xylan than softwood, is deresinated and then delignified by treatment to obtain a "chlorite holocellulose" type of pulp. The holocellulose is employed as the starting material.

The ratio of liquid ammonia to holocellulose is not critical so long as it is sufficient to obtain a swollen material. Anhydrous ammnoia is liquid at atmospheric pressure at a temperature of about —33° C. The use of higher temperatures necessitate the application of pressure to the reaction to maintain the ammonia in the liquid state.

Water-soluble films are prepared by casting either a water solution of the dried product or the extract liquid on a smooth surface and evaporating the water. Water-soluble plasticizers and other water-soluble film additives may be employed in the film-forming solution.

The water extraction of polysaccharides from holocellulose swollen with liquid ammonia at atmospheric pressure is taught by Bishop and Adams, Canadian Jour. Reseach, 28B (1950), 753. The writers, however, treated the swollen cellulose with mildly alkaline water to extract the hemicellulose and obtained a deacetylated material which they attributed to the action of liquid ammonia.

The results of Bishop and Adams were verified by duplicating the work done. It was found, however, that if the extraction step was carried out with buffered water at about pH 5, the acetyl content of the holocellulose was not lost and infrared spectroscopic data and analysis indicated that the water-soluble extracts was predominantly an o-acetyl, 4-o-methyl glucurono xylan.

The method of this invention is demonstrated in the following example.

*Example.—Preparation of birch wood holocellulose*

Birch wood chips were deresinated first by placing 1000 g. of air-dry wood chips in a 12 liter round-bottom flask, adding 6 liters of 1:2 mixture of ethyl alcohol to toluene to the chips and refluxing with stirring for 48 hours. The mass was filtered, washed well with methanol and damp-dried under vacuum. While the chips were still damp with methanol they were placed in the 12 liter flask, covered with ice and stirred for 16 hours. The chips were filtered, washed well with acetone, damp-dried under vacuum, and spread out to air dry.

The deresinated chips were treated to obtain chlorite holocellulose by placing 500 g. of the chips in the 12 liter round-bottom flask, adding 6 liters of water and heating to 65° C. under vacuum for two hours. After this, 50 ml. of glacial acetic acid were added to the flask and then 150 g. of sodium chlorite was slowly added with occasional slow stirring. The temperature was maintained between 70 and 80° C. The procedure of adding glacial acetic acid and sodium chlorite as recited above was repeated 5 times at hourly intervals. Thereafter the flask and its contents were allowed to cool and settle out overnight. Next, the supernatant liquid was decanted through a Büchner funnel and the residue collected on a filter. The residue was washed several times with cold water, made slightly acidic with cold acetic acid until the odor of chlorine was gone, washed twice with acetone to remove water and acetic acid, and spread out to air-dry.

The birch wood holocellulose was swollen with liquid ammonia by placing 50 g. of oven-dry holocellulose in a swelling flask. 500 ml. of liquid ammonia was added using a dropping funnel and stirring was started when most of the sample had come in contact with the ammonia and continued for 30 seconds after all the ammonia had been added. Excess liquid ammonia was pulled off from the swelling flask into an attached collecting flask and the entire apparatus was put under vacuum until no further frost was present on the swelling flask (approximately 4–5 hours). The liquid ammonia in the collecting flask was kept under vacuum overnight and the holocellulose was removed from the swelling flask and placed in a desiccator under vacuum overnight.

The liquid ammonia in the collecting flask was evaporated and a remaining extract removed, weighed, and stored. The swollen holocellulose was removed from the desiccator, weighed and stored for extraction.

The swollen holocellulose was subjected to an extraction procedure with buffered water by placing the holocellulose in a round-bottom flask, adding 500 ml. of distilled water buffered to pH 5 with a buffer tablet compounded from potassium acid phthalate and sodium phosphate, and heating to 70° C. with stirring. The mixture was maintained at 70° C. for 3 hours and then filtered through a steam heated Büchner funnel. After the filtrate was cooled and measured it was precipitated in 6 times its volume of denatured alcohol with an added few drops of concentrated hydrochloric acid. The precipitate was permitted to settle and filter without completely drying and was then washed with ethyl alcohol until the odor of denatured alcohol was gone. The precipitate was then washed twice with petroleum ether, dried damp under vacuum and spread out to air dry.

Analysis of the obtained extract was as follows.

TABLE I

| | Percent |
|---|---|
| Yield based on wt. of wood | 7.2 |
| Acetyl | 6.7 |
| Methoxyl | 2.03 |
| Pentosan | 68.1 |
| Uronic acid | 11.1 |

The extract produced by the action of liquid ammonia on the holocellulose had the following analysis.

TABLE II

| | Percent |
|---|---|
| Yield based on wt. of wood | 5.6 |
| Acetyl | 0.71 |
| Methoxyl | 1.92 |
| Pentosan | -- |
| Uronic acid | 6.0 |

A 10% solution of the extract in water was used to cast films on a smooth supporting surface, and to determine solubility in water. The extract formed in clear solution in cold water and films formed from the solution were clear and water soluble.

Various changes and modifications may be made practicing the invention without departing from the spirit and scope thereof and, therefore, the invention is not to be limited except as defined in the appended claims.

We claim:

1. A method of isolating acetylated polysaccharides from substantially lignin-free and partially delignified vegetable material which comprises treating said lignin-free material with liquid ammonia until it becomes swollen, and extracting water-soluble, acetylated polysaccharide from the swollen material with buffered water at a pH of from 4 to 6.

2. The method of claim 1 wherein the lignin-free vegetable material is hardwood holocellulose.

3. The method of claim 1 wherein the lignin-free vegetable material is softwood holocellulose.

4. The method of claim 1 wherein the pH is 5.

5. A method of isolating acetylated xylan from hardwood holocellulose which comprises treating said holocellulose with liquid ammonia under atmospheric pressure until swollen, and extracting water-soluble acetylated xylan from the swollen holocellulose with buffered water at a pH of 4 to 6 and at a temperature of about 70 to 75° C.

6. A method of forming water-soluble films which comprises treating hardwood holocellulose with liquid ammonia until swollen, extracting water-soluble acetylated xylan from the swollen holocellulose with buffered water at a pH of from 4 to 6, casting an aqueous solution of the extract on a smooth surface to form a film, and evaporating sufficient water from the solution to obtain a self-supporting film.

7. The method of claim 5 wherein the pH is 5.

References Cited by the Examiner

Bishop et al., Canadian Jour. Research, vol. 28B (1953), p. 753.

Whistler et al., Polysaccharide Chemistry, page 143 (1953).

LEWIS GOTTS, *Primary Examiner.*

CHARLES B. PARKER, *Examiner.*